(12) United States Patent
Yasui et al.

(10) Patent No.: US 9,475,471 B2
(45) Date of Patent: Oct. 25, 2016

(54) BRAKING CONTROL APPARATUS FOR VEHICLE

(71) Applicants: Yoshiyuki Yasui, Nagoya (JP); Hiroyuki Kodama, Kariya (JP); Naotoshi Satake, Nagoya (JP)

(72) Inventors: Yoshiyuki Yasui, Nagoya (JP); Hiroyuki Kodama, Kariya (JP); Naotoshi Satake, Nagoya (JP)

(73) Assignee: ADVICS CO., LTD., Kariya-Shi, Aichi (JP)

( * ) Notice: Subject to any disclaimer, the term of this patent is extended or adjusted under 35 U.S.C. 154(b) by 60 days.

(21) Appl. No.: 14/368,868

(22) PCT Filed: Dec. 25, 2012

(86) PCT No.: PCT/JP2012/083443
§ 371 (c)(1),
(2) Date: Dec. 8, 2014

(87) PCT Pub. No.: WO2013/099852
PCT Pub. Date: Jul. 4, 2013

(65) Prior Publication Data
US 2015/0151727 A1 Jun. 4, 2015

(30) Foreign Application Priority Data

Dec. 27, 2011 (JP) ................................ 2011-284592

(51) Int. Cl.
*G06F 7/70* (2006.01)
*B60T 8/172* (2006.01)
(Continued)

(52) U.S. Cl.
CPC ................ *B60T 8/172* (2013.01); *B60T 7/042* (2013.01); *B60T 8/171* (2013.01); *B60T 8/58* (2013.01);
(Continued)

(58) Field of Classification Search
CPC ...... B60T 13/741; B60T 8/00; B60W 10/192
See application file for complete search history.

(56) References Cited

U.S. PATENT DOCUMENTS

2004/0182657 A1* 9/2004 Kamiya ................ B60T 13/741
188/72.1
2011/0246039 A1 10/2011 Takeda et al.
2012/0285777 A1 11/2012 Oshio et al.

FOREIGN PATENT DOCUMENTS

EP  1 323 608 A1  7/2003
EP  1 916 168 A1  4/2008
(Continued)

OTHER PUBLICATIONS

International Search Report (PCT/ISA/210) mailed on Feb. 26, 2013, by the Japanese Patent Office as the International Searching Authority for International Application No. PCT/JP2012/083443.
(Continued)

*Primary Examiner* — Michael D Lang
(74) *Attorney, Agent, or Firm* — Buchanan Ingersoll & Rooney PC (57) ABSTRACT

Based on a difference between target and actual values of a friction member force pressing a brake disc, feedback control over the pressing force is executed. As the actual value, a "limit pressing force (Fbs) obtained by placing a limitation on a temporal change amount of the Fba based on a limit value (Lmt)" is used. The limit value (Lmt) is set based on an electric motor speed (dMkt, dMka), a wheel speed (Vwa), and a temporal change amount (ΔTmp) of the friction member temperature. The Lmt is set to increase as the dMkt (dMka) increases and the temporal change amount (ΔTmp) of the temperature increases, and to also increase as the wheel speed (Vwa) decreases. Thus, even when a rotating member (brake disc) is deformed, braking torque control can be appropriately executed without accelerating a fluctuation of a braking torque on the wheel.

16 Claims, 8 Drawing Sheets

(51) Int. Cl.
- *B60T 13/74* (2006.01)
- *B60T 7/04* (2006.01)
- *B60T 13/66* (2006.01)
- *B60T 17/22* (2006.01)
- *F16D 65/18* (2006.01)
- *B60T 8/171* (2006.01)
- *B60T 8/58* (2006.01)
- *F16D 66/00* (2006.01)
- *F16D 125/40* (2012.01)
- *F16D 125/48* (2012.01)

(52) U.S. Cl.
CPC ............ *B60T 13/662* (2013.01); *B60T 13/741* (2013.01); *B60T 17/22* (2013.01); *F16D 65/18* (2013.01); *F16D 2066/005* (2013.01); *F16D 2125/40* (2013.01); *F16D 2125/48* (2013.01)

(56) References Cited

FOREIGN PATENT DOCUMENTS

| | | |
|---|---|---|
| JP | 2000-283193 A | 10/2000 |
| JP | 2001-088669 A | 4/2001 |
| JP | 2002-225690 A | 8/2002 |
| JP | 2003-175811 A | 6/2003 |
| JP | 2011-173521 A | 9/2011 |
| JP | 2011-213201 A | 10/2011 |

OTHER PUBLICATIONS

Written Opinion (PCT/ISA/237) mailed on Feb. 26, 2013, by the Japanese Patent Office as the International Searching Authority for International Application No. PCT/JP2012/083443.

Extended European Search Report dated Sep. 28, 2015, issued by the European Patent Office in corresponding European Application No. 12862476.4. (7 pages).

* cited by examiner

BRAKING CONTROL APPARATUS FOR VEHICLE

TECHNICAL FIELD

The present invention relates to a vehicle brake control device.

BACKGROUND ART

Hitherto, there has been known a vehicle brake control device configured to generate a braking torque by an electric motor. In this type of device, typically, an indicator current (target current) is calculated based on an operation amount of a braking operation member for the vehicle by a driver, and the electric motor is controlled based on the indicator current. Then, a braking torque that depends on the operation of the braking operation member is applied to the wheels.

Regarding this type of device, Japanese Patent Application Laid-open No. 2000-283193 has the following description. Specifically, a thickness variation sometimes occurs in a sliding surface of a disc rotor due to frictional heat generated during braking or the like. In particular, when a braking-torque fluctuation occurs due to the thickness variation at the time of braking, a vibration (judder) of a vehicle body or brake squeal may be caused. Therefore, when the braking-torque fluctuation proportional to the number of revolutions of the disc rotor occurs, an electric caliper is actuated so as to cancel the vibration. In this manner, the vibration of the disc rotor is damped actively.

SUMMARY OF INVENTION

When the disc rotor (also referred to as "brake disc") has a variation in a thickness direction (thickness variation), a fluctuation is caused in a braking torque on a wheel by the variation. For example, when it is assumed that positions of friction members (brake pads) with respect to the brake disc are fixed, the thickness variation of the brake disc is absorbed by a stiffness of the whole brake caliper. Therefore, a force of the friction members to press the brake disc is fluctuated. As a result, the braking torque on the wheel is fluctuated. Such a vibration phenomenon may also occur in a drum brake when a brake drum is deformed or the like.

In order to suppress the above-mentioned fluctuation of the braking torque on the wheel, a device which actively controls the electric caliper as in the case of the device described in Japanese Patent Application Laid-open No. 2000-283193 has been proposed. On the other hand, even when the force of the friction members to press the brake disc is detected and feedback control is executed based on the result of detection (actual pressing force), the braking-torque fluctuation can also be reduced. When the feedback control over the pressing force is to be embodied, however, a responsiveness of a control system (system) is required to be taken into consideration.

Figure 8:
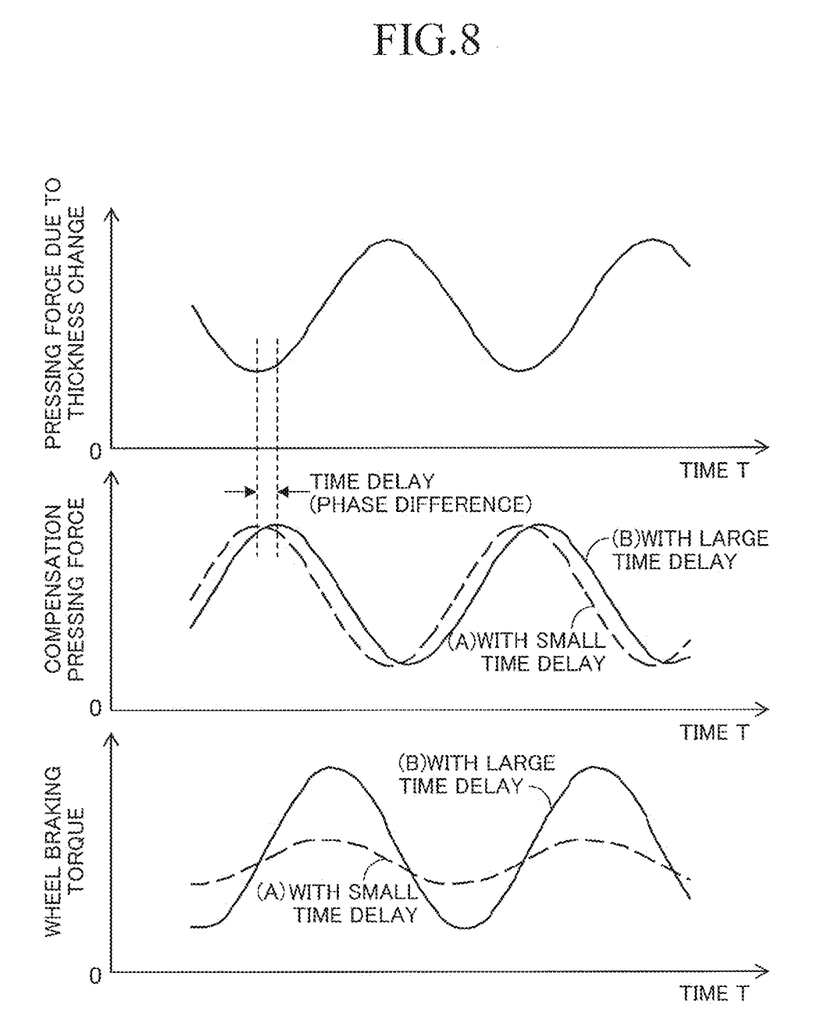
FIG. 8 is a graph showing the relationship between a response (change in output with respect to an input) of a control system and a braking-torque fluctuation.

Now, referring to FIG. 8, the relationship between a response of the system (change in output with respect to an input) and the braking-torque fluctuation is described. First, the case where the responsiveness of the system is high is described. In this case, a compensation pressing force by the feedback control (pressing force for suppressing the fluctuation) can be calculated so as to follow a fluctuation of a pressing force (hereinafter referred to as "pressing-force fluctuation") due to the thickness variation of the brake disc without a time delay. As a result, the pressing-force fluctuation is reduced, and hence the braking-torque fluctuation can be effectively reduced.

On the other hand, when the responsiveness of the system is low and the time delay exists (in the case where the system cannot follow the pressing-force fluctuation), the effects of suppressing the braking-torque fluctuation are reduced. Further, the pressing-force fluctuation has a higher frequency as a rotation speed of the wheel (that is, a speed of the vehicle) increases. As a result, when the compensation pressing force has the opposite phase to that of the pressing-force fluctuation due to the increase in the delay time of the compensation pressing force, the braking-torque fluctuation is accelerated.

Further, an actual pressing-force fluctuation leads to a fluctuation of an energization amount (for example, a current) for driving the electric motor. Thus, the control over the electric motor becomes complicated to increase power consumption.

The present invention has been made to solve the problem described above, and therefore has an object to provide a brake control device for performing feedback control over a force of a friction member (for example, a brake pad) to press a rotating member (for example, a brake disc), which is capable of appropriately executing braking-torque control without accelerating a fluctuation of a braking torque on a wheel even when the rotating member is deformed.

According to one embodiment of the present invention, there is provided a vehicle brake control device, including: operation amount acquisition means (BPA) for acquiring an operation amount (Bpa) of a braking operation member (BP) for a vehicle by a driver; braking means (BRK) for pressing a friction member (MSB) against a rotating member (KTB) fixed to a wheel (WHL) of the vehicle through intermediation of an electric motor (MTR) to generate a braking torque for the wheel (WHL); pressing-force acquisition means (FBA) for acquiring a pressing force (Fba) of the friction member (MSB) on the rotating member (KTB); and control means (CTL) for calculating a target energization amount (Imt) based on the operation amount (Bpa) and the pressing force (Fba) and controlling the electric motor (MTR) based on the target energization amount (Imt)

The present invention has a feature in that the control means (CTL) is configured as follows. Specifically, based on an operation speed correlation value (dMkt, dFbt, dBp, dMka) correlated with a temporal change amount of the operation amount (Bpa), a limit value (Lmt) for suppressing a fluctuation of the pressing force (Fba) is calculated. Based on the limit value (Lmt), a limit pressing force (Fbs) obtained by placing a limitation on a temporal change amount of the pressing force (Fba) is calculated. Then, based on the limit pressing force (Fbs), the target energization amount (Imt) is calculated.

Here, based on a change pattern of the pressing force (Fba), which is acquired in advance when step-input of the target energization amount (Imt) to the electric motor (MTR) is performed, the limit value (Lmt) can be determined.

Moreover, based on the "actual speed (dMka) of the electric motor (MTR)" as the above-mentioned "operation speed correlation value", the limit value (Lmt) can be calculated. This is based on the fact that a position (rotation angle) of the electric motor and the pressing force have a correlation with each other by the functions of a stiffness (spring constant) of the whole BRK. Specifically, based on the actual speed (dMka) of the electric motor, the limit value Lmt can be determined so as to increase in accordance with an increase of the dMkt.

In general, a vibration (noise) is generated in the pressing force Fba due to the deformation (unevenness in thickness) of the rotating member (for example, the brake disc). Here, the temporal change amount of the pressing force Fba can be roughly classified into a component due to a change in the braking operation amount Bpa and a noise component due to the above-mentioned deformation. According to the configuration described above, by the limit value Lmt which is set based on the operation speed correlation value (that is, the value correlated with the temporal change amount of the operation amount Bpa), the former component can be allowed, whereas the latter component can be removed. Therefore, the complication of the control is eliminated. As a result, the stable control over the electric motor can be achieved.

More specifically, according to the above-mentioned configuration, the limit value Lmt can be determined so as to increase in accordance with the increase of the operation speed correlation value. Therefore, when an operation speed of the braking operation member (BP) is high, the degree of suppressing the pressing-force fluctuation is lowered. Therefore, the responsiveness of the pressing force Fba to the quick operation of the braking operation member (BP) can be ensured. On the other hand, when the operation speed of the braking operation member (BP) is low, the degree of suppressing the pressing-force fluctuation is elevated. Therefore, the above-mentioned "noise component due to the deformation of the rotating member" in the fluctuation of the pressing force Fba can be effectively removed.

It is preferred that the above-mentioned brake control device be configured to calculate the limit value (Lmt) based on a temporal change amount (ΔTmp) of a temperature (Tmp) of the braking means (BRK).

In general, when the friction member (for example, the brake pad) expands due to a temperature rise, the pressing force Fba increases. According to the above-mentioned configuration, the change in the temperature Tmp of the BRK is taken into consideration for the determination of the limit value Lmt. Therefore, the "noise component due to the deformation of the rotating member" can be appropriately removed.

In the above-mentioned brake control device, it is preferred that, when a rotation speed (Vwa) of the wheel is high, an absolute value of the limit value (Lmt) be determined to be relatively small, and when the rotation speed (Vwa) of the wheel is low, the absolute value of the limit value (Lmt) be determined to be relatively large.

In general, when the speed of the wheel (that is, a speed of the vehicle) is low, a response of the electric motor can follow the braking-torque fluctuation due to the disc thickness variation in pressing-force feedback control. Based on the above-mentioned point of view, even if the degree of suppressing the pressing-force fluctuation is lowered when the speed of the wheel (vehicle) is low, the braking-torque fluctuation can be suppressed sufficiently by the above-mentioned feedback control itself. The above-mentioned configuration is based on the knowledge described above.

Similarly, in the above-mentioned brake control device, it is preferred that, when the rotation speed (Vwa) of the wheel is smaller than a predetermined value (vw1), the actual pressing force (Fba) be determined as the limit pressing force (Fbs).

According to the description given above, when the wheel speed Vwa is smaller than the predetermined value vw1, the limit value Lmt is set to "infinity (∞)" to achieve Fbs=Fba. Specifically, when Vwa<vw1 holds, the limitation with the limit value Lmt is not performed. As described above, the configuration is based on the fact that "the braking-torque fluctuation can be sufficiently suppressed by the above-mentioned feedback control itself even if the degree of suppressing the pressing-force fluctuation is lowered when the speed of the wheel (vehicle) is low".

DESCRIPTION OF EMBODIMENT

Now, a vehicle brake control device according to embodiment of the present invention is described with reference to the drawings.

<Overall Configuration of Vehicle Equipped with Vehicle Brake Control Device of the Present Invention>

Figure 1:
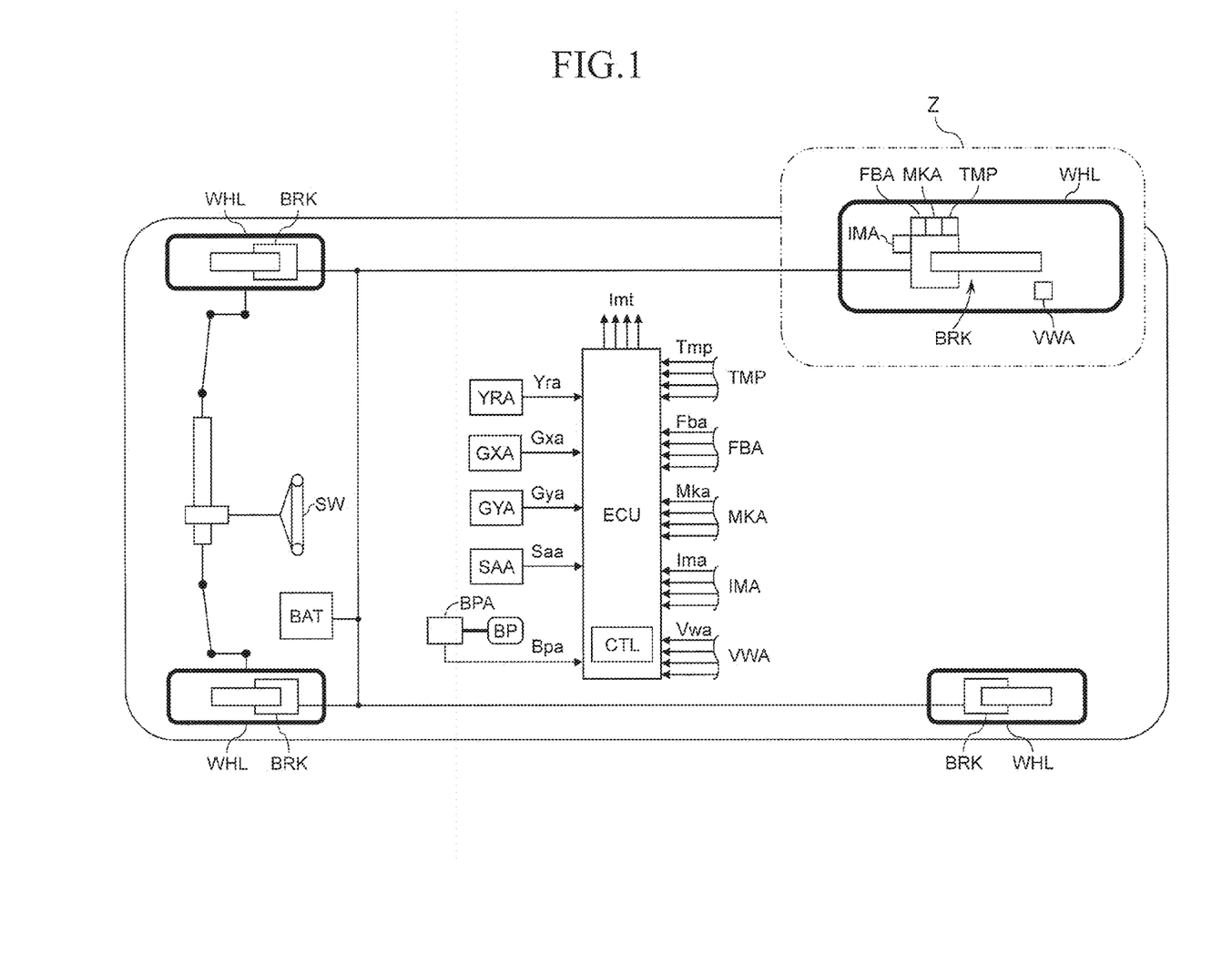
FIG. 1 is a schematic configuration diagram of a vehicle in which a brake control device according to an embodiment of the present invention is mounted.

As illustrated in FIG. 1, this vehicle is equipped with a braking operation member (for example, brake pedal) BP that is used by a driver for decelerating the vehicle, braking means (brake actuator) BRK by which a braking torque of each wheel is adjusted to generate a braking force therefor, an electronic control unit ECU for controlling the BRK, and a battery BAT as a power source for supplying electric power to the BRK, the ECU, and the like.

In addition, this vehicle includes braking operation amount acquisition means (for example, stroke sensor or leg-force sensor) BPA for detecting an operation amount Bpa of the BP, steering angle detection means SAA for detecting a steering angle Saa of a steering wheel SW operated by the driver, yaw rate detection means YRA for detecting a yaw rate Yra of the vehicle, longitudinal acceleration detection means GXA for detecting a vehicle longitudinal acceleration Gxa, lateral acceleration detection means GYA for detecting a vehicle lateral acceleration Gya, and wheel speed detection means VWA for detecting a rotation speed (wheel speed) Vwa of each wheel WHL.

The braking means BRK is equipped with an electric motor MTR (not shown) and the braking torque of the wheel WHL is controlled by the MTR. In addition, the BRK includes pressing force detection means (for example, axial force sensor) FBA for detecting a pressing force Fba of a friction member to press a rotating member, energization amount detection means (for example, current sensor) IMA for detecting an energization amount (for example, current value) Ima to the MTR, position detection means (for example, rotation angle sensor) MKA for detecting the position (for example, rotation angle) Mka of the MTR, and temperature acquisition means (for example, temperature sensor) for detecting a temperature Tmp of the friction member.

The above-mentioned signals (such as Bpa) that are detected by the various detection means are subject to noise removal (reduction) filter (for example, low-pass filter) processing and then are supplied to the ECU. In the ECU, arithmetic processing for the brake control related to the present invention is executed. That is, control means CTL to be described later is programmed in the ECU, and a target energization amount (for example, target current value or target duty ratio) Imt for controlling the electric motor MTR is calculated based on the Bpa and the like. In addition, based on the Vwa, the Yra, and the like, in the ECU, arithmetic processing is executed for, for example, anti-skid control (ABS), traction control (TCS), and vehicle stabilization control (ESC) that are known.

<Configuration of Braking Means (Brake Actuator) BRK>

In the brake control device according to the present invention, the electric motor MTR generates and adjusts the braking torque of the wheel WHL.

Figure 2:
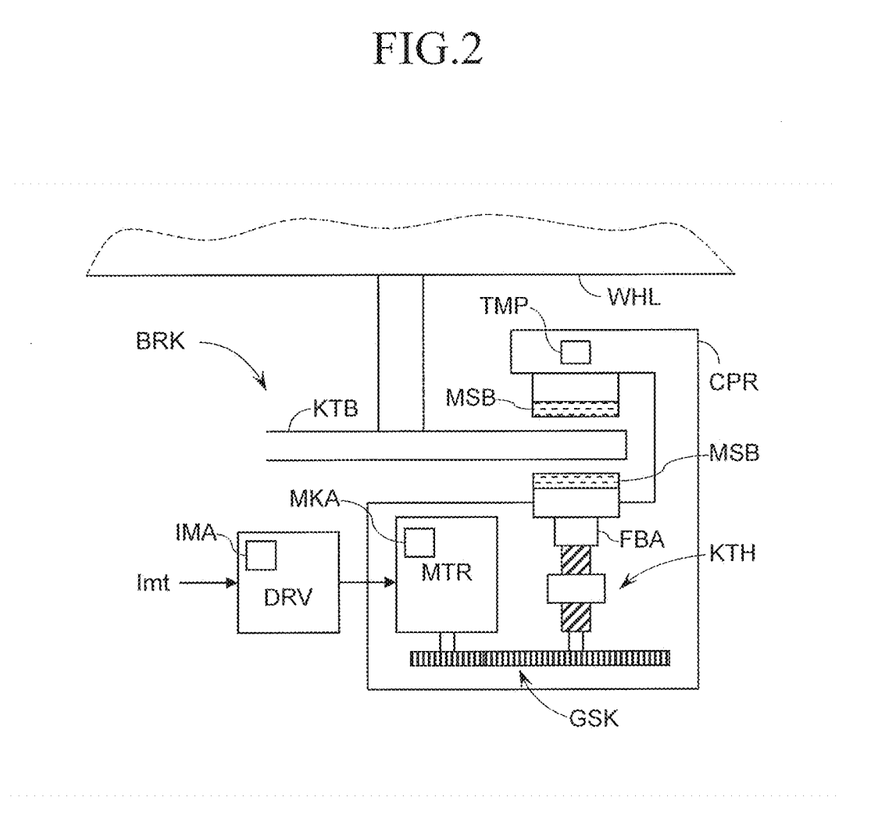
FIG. 2 is a diagram illustrating a configuration of braking means (brake actuator) (Z portion) illustrated in FIG. 1.

As illustrated in FIG. 2 that is an enlarged view of the Z portion of FIG. 1, the braking means BRK includes a brake caliper CPR, a rotating member KTB, a friction member MSB, the electric motor MTR, driving means DRV, a reducer GSK, a rotation/linear motion conversion mechanism KTH, the pressing-force acquisition means FBA, the position detection means MKA, the temperature acquisition means TMP, and the energization amount acquisition means IMA.

Similarly to the known braking device, the brake actuator BRK includes the brake caliper CPR that is known and the friction members (for example, brake pads) MSB. The MSBs are pressed against the rotating member (for example, brake disc) KTB that is known to cause frictional forces, thereby generating a braking torque at the wheel WHL.

In the driving means (driving circuit of the electric motor MTR) DRV, based on the target energization amount (target value) Imt, an energization amount (finally, current value) to the electric motor MTR is controlled. Specifically, in the driving means DRV, a bridge circuit that uses power transistors (for example, MOS-FETs) is formed, and the power transistors are driven based on the target energization amount Imt to control the output of the electric motor MTR.

The output (output torque) of the electric motor MTR is transmitted, by way of the reducer (for example, gear sets) GSK, to the rotation/linear motion conversion mechanism KTH. Then, the KTH converts a rotation motion into a linear motion, and the linear motion urges the friction members (brake pads) MSB onto the rotating member (brake disc) KTB. The KTB is fixed to the wheel WHL, and the friction between the MSB and the KTB generates and adjusts the braking torque at the wheel WHL. As the rotation/linear motion conversion mechanism KTH, a sliding screw (for example, trapezoidal screw) that uses "sliding" for power transmission (sliding transmission) or a ball screw that uses "rolling" for power transmission (rolling transmission) is available.

The motor driving circuit DRV includes the energization amount acquisition means (for example, current sensor) IMA for detecting the actual energization amount (for example, actual current flowing to the electric motor) Ima. In addition, the electric motor MTR is equipped with the position detection means (for example, angle sensor) MKA for detecting the position (for example, rotation angle) Mka of the electric motor MTR. Further, the pressing-force acquisition means (for example, force sensor) FBA is provided for acquiring (detecting) the force (actual pressing force) Fba with which the friction member MSB actually presses the rotating member KTB.

In order to acquire (detect) the temperature Tmp of the friction member MSB, the temperature acquisition means (for example, temperature sensor) TMP is provided. The temperature of the MSB rises due to frictional heat generated between the MSB and the KTB. Therefore, the temperature Tmp of the MSB can be calculated based on the state quantity Bpa, Fbt (target pressing force), or Mkt (target position of the electric motor) described later from the braking operation amount Bpa to the electric motor (target energization amount Imt). Moreover, the temperature of the MSB can be calculated based on the actual state quantity Ima (actual energization amount of the electric motor), Mka (actual position of the electric motor), or Fba (actual pressing force) from (the output of) the electric motor to (the pressing force of) the MSB.

In FIG. 2, a so-called disc type braking device (disc brake) is illustrated as an exemplary configuration of the braking means BRK, but the braking means BRK may be in the form of a drum type braking device (drum brake). In the case of the drum brake, the friction member MSB is a brake shoe and the rotating member KTB is a brake drum. Similarly, the force with which the brake shoe presses the brake drum (pressing force) is controlled by the electric motor MTR. As the electric motor MTR, a device that generates a torque by rotation motion is exemplified, but a linear motor is available that generates a force by linear motion.

<Overall Configuration of Control Means CTL>

Figure 3:
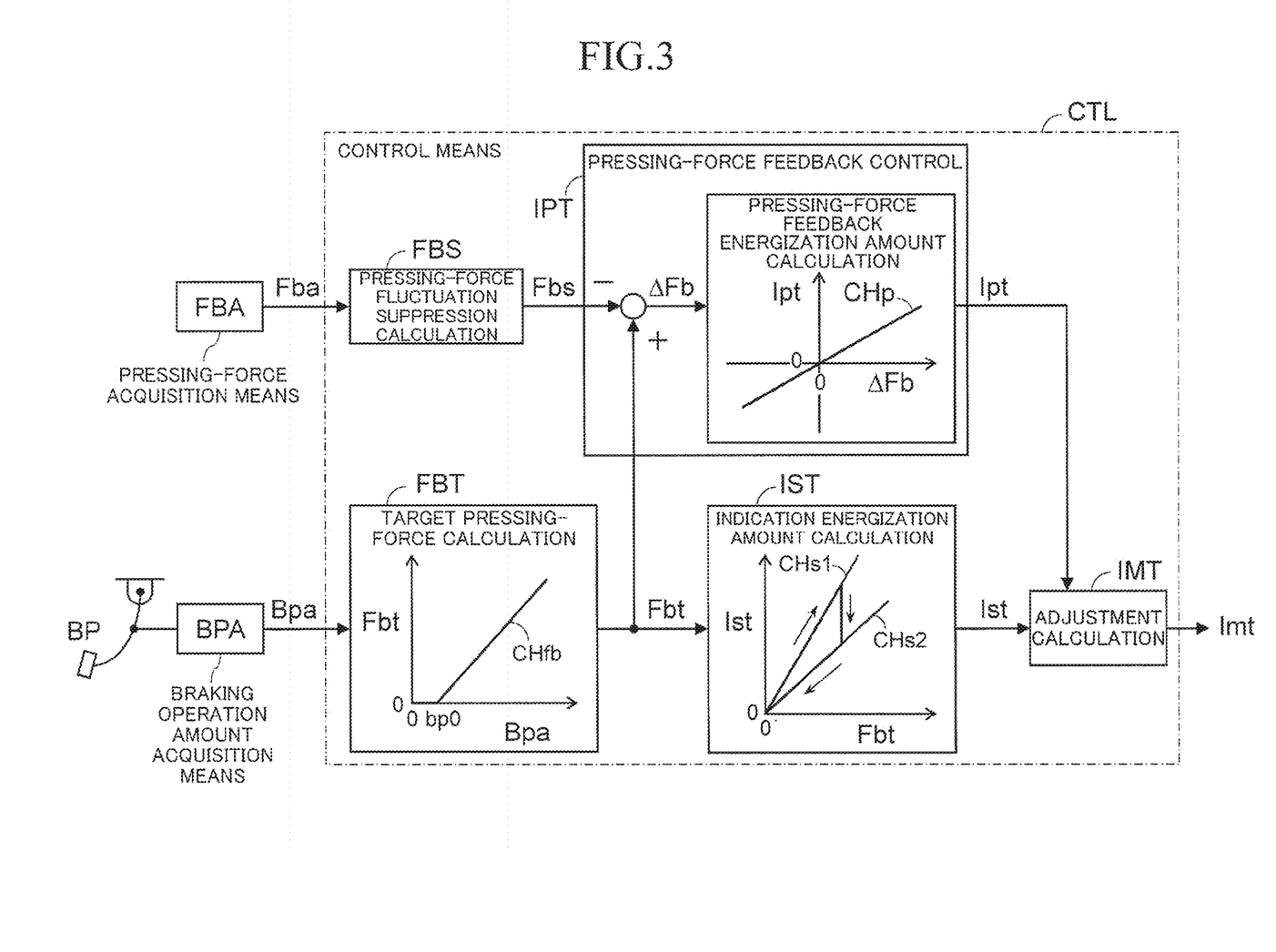
FIG. 3 is a functional block diagram illustrating control means (brake controller) illustrated in FIG. 1.

As illustrated in FIG. 3, the control means CTL that is illustrated in FIG. 1 includes a target pressing-force calculation block FBT, an indication energization amount calculation block IST, a pressing-force fluctuation suppression calculation clock FBS, a pressing-force feedback control block IPT, and an energization amount adjustment calculation block IMT. The control means CTL is programmed in the electronic control unit ECU.

The operation amount Bpa of the braking operation member BP (for example, brake pedal) is acquired by the braking operation amount acquisition means BPA. The operation amount of the braking operation member (braking operation amount) Bpa is calculated based on at least one of an operation force of the braking operation member (for example, brake pedal force) operated by the driver and a displacement amount (for example, brake pedal stroke) thereof. The Bpa is subject to calculation processing using a low-pass filter or the like for noise component removal (reduction).

In the target pressing-force calculation block FBT, a preset target pressing force calculation characteristic (calculation map) CHfb is used for calculating the target pressing force Fbt based on the operation amount Bpa. The "pressing force" is a force with which the friction member (for example, brake pad) MSB presses the rotating member (for example, brake disc) KTB in the braking means (brake actuator) BRK. The target pressing force Fbt is a target value of the pressing force.

The indication energization amount calculation block IST calculates, by using preset calculation maps CHs1 and CHs2, an indication energization amount Ist based on the target pressing force Fbt. The indication energization amount Ist is a target value of the energization amount to the electric motor MTR, which is used for driving the electric motor MTR of the braking means BRK to achieve the target pressing force Fbt. Taking into consideration of the hysteresis of the brake actuator, the calculation map (calculation characteristics for indication energization amount) has the two characteristics CHs1 and CHs2. The characteristic (first indication energization amount calculation characteristic) CHs1 is for coping with an increase of the pressing force, while the characteristic (second indication energization amount calculation characteristic) CHs2 is for coping with a decrease of the pressing force. For this reason, the characteristic CHs1 is set so as to output a relatively large indication energization amount Ist as compared to the characteristic CHs2.

As used herein, the energization amount is a state amount (variable) for controlling an output torque of the electric motor MTR. Due to the fact that the torque output from the electric motor MTR is almost in proportion to a current supplied thereto, a current target value of the electric motor is available as a target value of the energization amount. In addition, when a voltage supplied to the electric motor MTR is increased, the resultant current is increased, and hence a supply voltage value is available as the target energization amount. Moreover, a duty ratio in pulse width modulation (PWM) can adjust the supply voltage value, and hence this duty ratio is available as the energization amount.

In the pressing-force fluctuation suppression calculation block FBS, a limit pressing force Fbs obtained by removing a fluctuation component from the actual pressing force (actual value) Fba acquired (detected) by the pressing-force acquisition means FBS is calculated. The FBS is described later in detail.

In the pressing-force feedback control block IPT, a pressing-force feedback energization amount Ipt is calculated based on the target pressing force (target value) Fbt and the limit pressing force (actual value) Fbs. The indication energization amount Ist is calculated as a value that corresponds to the target pressing force Fbt, but an efficiency variation of the brake actuator may cause an error (steady error) between the target pressing force Fbt and the actual pressing force Fba. Further, due to uneven wear or thermal deformation of the brake disc, an error (transient error) in accordance with a rotation period of the wheel is caused. The pressing-force feedback energization amount Ipt is calculated and determined to decrease the above-mentioned error (steady error and transient error) based on a deviation (pressing-force deviation) ΔFb between the target pressing force Fbt and the limit pressing force Fbs and a calculation characteristic (calculation map) CHp. The limit pressing force Fbs is an actual value obtained by removing the "noise component due to the deformation of the rotating member" from the actual pressing force Fba acquired by the pressing-force acquisition means FBA.

Then, in the energization amount adjustment calculation block IMT, the indication energization amount Ist is adjusted by the pressing-force feedback energization amount Ipt, thereby calculating the target energization amount Imt. Specifically, the indication energization amount Ist is added with the feedback energization amount Ipt, and the resultant sum is calculated as the target energization amount Imt. The target energization amount Imt is a final target value of the energization amount for controlling the output of the electric motor MTR.

<Pressing-Force Fluctuation Suppression Calculation Block FBS of Embodiment>

Figure 4:
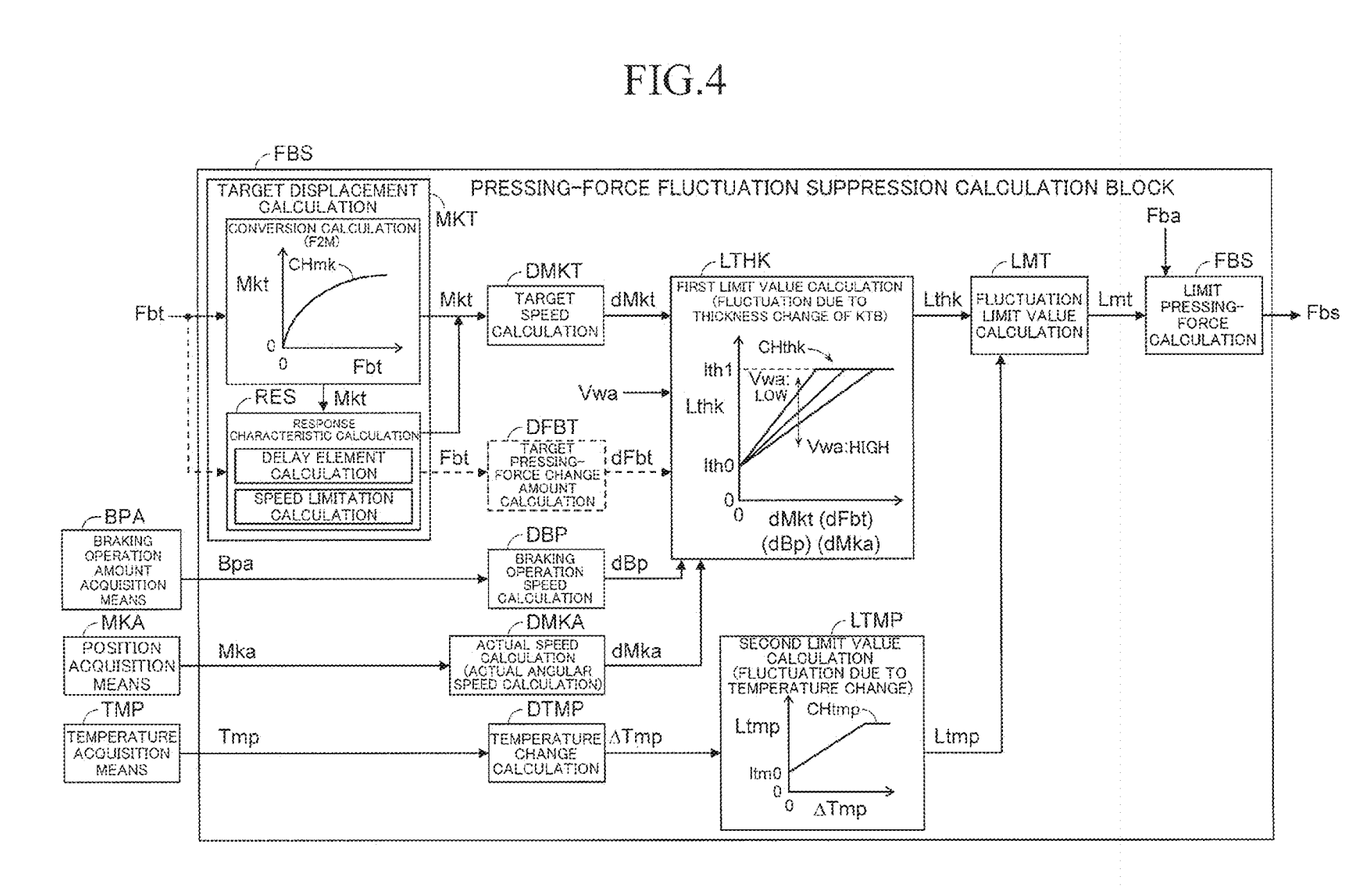
FIG. 4 is a functional block diagram illustrating a pressing-force fluctuation suppression calculation block FBS illustrated in FIG. 3 according to an embodiment of the present invention.

FIG. 4 is a functional block diagram illustrating the pressing-force fluctuation suppression calculation block FBS in the control means CTL according to an embodiment of the present invention. The FBS includes a target position calculation block MKT, a target speed calculation block DMKT, a first limit value calculation block LTHK, a temperature change calculation block DTMP, a second limit value calculation block LTMP, a fluctuation limit value calculation block LMT, and a limit pressing-force calculation block FBS.

The target position calculation block MKT includes a conversion calculation block F2M and a response characteristic calculation block RES.

In the conversion calculation block F2M, the target position (target rotation angle) Mkt is calculated based on the target pressing force Fbt and a target pressing-force calculation characteristic (calculation map) CHmk. The target position Mkt is a target value of the position (rotation angle) of the electric motor MTR. The calculation map CHmk is a characteristic corresponding to a stiffness of the brake caliper CPR and the friction members (brake pads) MSB and is stored in advance in the electronic control unit ECU as a non-linear characteristic which is "concave down".

In the response characteristic calculation block RES, a limitation is imposed on a maximum response of the brake actuator BRK for the Mkt. Specifically, a transient response of the BRK is taken into consideration by a delay element calculation, while a maximum speed of the electric motor is limited by a speed limitation calculation.

Figure 5:
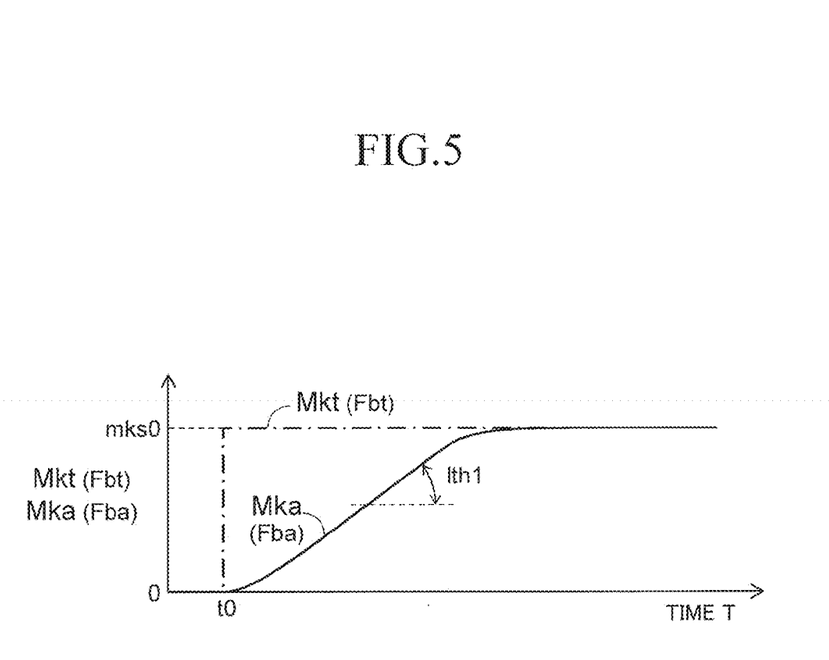
FIG. 5 is a graph showing a maximum response of the braking means (brake actuator).

Now, the maximum response of the brake actuator BRK is described referring to FIG. 5. The maximum response of the BRK is maximum performance with which the BRK can make a response. When a step-input (target energization amount) is given to the electric motor MTR which drives the BRK, the output (the position of the electric motor) appears with a delay with respect to a change of the input. A response having a maximum valve (state of a temporal change amount of the output corresponding to a temporal change amount of the input), which can follow the step-input is referred to as a maximum response. Specifically, the maximum response is obtained based on a change of the actual value (output) Mka of the rotation angle when the (predetermined) target energization amount lmt is input in a stepwise manner (that is, the step-input in which the target value Mkt of the rotation angle is instantaneously increased to a predetermined amount mks0 is performed). The maximum response can also be obtained based on a change of the actual pressing force Fba with respect to the step-input. Based on a change of the Mka or Fba at the maximum response (step-response), a time constant τm, a dead time L, and the maximum speed described later are identified. By using the values described above, the delay element calculation and the speed limitation calculation described later are performed.

In the delay element calculation, based on the target position Mkt of the electric motor MTR, the target position Mkt that is the result of the delay element based calculation processing. In detail, the calculation processing that uses the delay element (for example, first-order delay element) that includes the time constant τm corresponding to the response of the brake actuator BRK (that is, the response of the electric motor MTR) is executed with respect to the target position Mkt of the electric motor, thereby calculating the post-delay process target position Mkt. By subjecting the Mkt to the delay processing, the response of the brake actuator BRK (state of a temporal change amount of the output corresponding to a temporal change amount of the input to the system) is considered as a transfer function with the delay element using the time constant, allowing to calculate the Mkt that is a target value corresponding to the response. As used herein, the transfer function is a function that is indicative of a relationship between inputs to the system (control system) and their corresponding outputs, and the time constant τm is a parameter that is indicative of the response speed of the delay element.

As the delay element, an n-th order delay element (n is an integer of "1" or more) is available. The delay element is represented in terms of Laplace transformation and, for example, in a case of the first-order delay element, a transfer function G(s) is represented by the following expression (1).

$$G(s)=K/(\tau m \cdot s+1) \quad (1)$$

Here, τm is a time constant, K is a constant, and s is Laplacian operator.

In addition, in a case where the delay element is a second-order delay element, the transfer function G(s) in the delay element calculation is represented by the following expression (2).

$$G(s)=K/\{s \cdot (\tau m \cdot s+1)\} \quad (2)$$

Moreover, in the delay element calculation, a dead time L may be considered. The dead time is a time period that is required until the output begins in response to the input. In such a case, the transfer function G(s) that is indicative of the response of the BRK is represented by the following expression (3) or expression (4).

Transfer function for delay element calculation using first-order delay and dead time:

$$G(s)=\{K/(\tau m \cdot s+1)\} \cdot e^{-L \cdot s} \quad (3)$$

Transfer function for delay element calculation using second-order delay and dead time:

$$G(s)=[K/\{s \cdot (\tau m \cdot s+1)\}]e^{-L \cdot s} \quad (4)$$

where L is the dead time, and e is Napierian number (the base of natural logarithms).

Further, in the speed limitation calculation, the maximum speed (maximum number of revolutions) of the electric motor is taken into consideration for the Mkt. Specifically, after the processing, a temporal change amount of the target position Mkt is limited to the maximum speed. Then, a new target position is calculated. After the delay element calculation and the speed limitation calculation are performed for the Mkt, the new target position Mkt (which is subjected to the response limitation) is output from the limitation calculation block LMT.

Referring to FIG. 4 again, in the target speed calculation block DMKT, a target speed dMkt of the electric motor is calculated based on the Mkt. Specifically, the Mkt is differentiated to calculate the dMkt.

In the first limit value calculation block LTHK, based on the target speed (corresponding to an operation speed correlation value) dMkt of the electric motor, the wheel speed Vwa, and a calculation characteristic (calculation map) CHthk, a first limit value Lthk is calculated. The first limit value Lthk is a limit value for suppressing the braking-torque fluctuation due to a thickness change of the rotation member. The Lthk is calculated so as to increase from a predetermined value lth0 as the dMkt increases. Moreover, the Lthk is calculated as a smaller value as the Vwa becomes higher and is calculated as a larger value as the Vwa becomes lower. Moreover, the relationship between the Lthk and the pressing-force fluctuation is such that a pressing-force fluctuation is allowed when the Lthk is large and the pressing-force fluctuation is suppressed when the Lthk is small. The Lthk can be calculated to be equal to or smaller than an upper limit value lth1. The upper limit value lth1 is a value which is set based on the maximum response of the BRK. The BRK does not respond to a value larger than the upper limit value.

The actual pressing force Fba acquired by the pressing-force acquisition means FBA contains a component due to a braking operation performed by a driver (hereinafter referred to as "braking operation component") and a component due to a thickness change of the rotating member (brake disc) KTB. A temporal change amount of the pressing force Fba by the braking operation performed by the driver is proportional to an operation speed of the braking operation member. Therefore, by the first limit value Lthk calculated based on the target speed (value correlated with the braking operation speed) dMkt of the electric motor, the braking operation component is allowed, whereas the thickness change component is removed.

The pressing-force fluctuation due to the thickness change of the brake disc is correlated with the number of revolutions of the wheel. For example, when a portion of the brake disc becomes thinner, one revolution of the wheel corresponds to one period of the pressing-force fluctuation. Therefore, when the actual wheel speed Vwa is low, a frequency of the pressing-force fluctuation due to the thickness change of the brake disc becomes lower. When the pressing-force fluctuation has a low frequency, a response of the electric motor MTR can follow the frequency. Therefore, with a decrease of the Vwa, the first limit value Lthk is calculated to be larger. As a result, when the Vwa is low (the vehicle speed is low), the pressing-force fluctuation can be actively reduced by feedback control.

In the temperature change calculation block DTMP, a temperature change ΔTmp is calculated based on the temperature (in particular, the temperature of the MSB) Tmp acquired (detected) by the temperature acquisition means TMP. The ΔTmp is a change amount of the temperature with respect to elapse of time and is calculated by differentiating the Tmp.

In the second limit value calculation block LTMP, a second limit value Ltmp is calculated based on the temperature change ΔTmp of the MSB and a calculation characteristic (calculation map) CHtmp. The friction members (brake pads) MSB expand with a temperature rise. Therefore, a pressing-force fluctuation component (hereinafter referred to as "temperature change component") due to the expansion is taken into consideration for the Ltmp. Specifically, a value of the Ltmp is determined so that the pressing-force fluctuation due to the expansion of the MSB is contained in (is not removed from) the Fba.

In the fluctuation limit value calculation block LMT, the final limit value Lmt is calculated based on the first limit value (allowing the braking operation component) Lthk and the second limit value (allowing the temperature change component) Ltmp. Specifically, the Ltmp is added to the Lthk to calculate the Lmt.

In the limit pressing-force calculation block FBS, the limit pressing force Fbs is calculated based on the limit value Lmt. Based on the limit value Lmt, a limitation is imposed on the temporal change amount of the actual pressing force Fba to calculate the limit pressing force Fbs. Specifically, when a temporal change amount of an absolute value of the Fba is equal to or smaller than the Lmt, the Fba is output directly as the Fbs. When the absolute value of the Fba changes to exceed the Lmt, the Fbs is calculated after the change amount of the Fba is limited to the Lmt.

Figure 6:
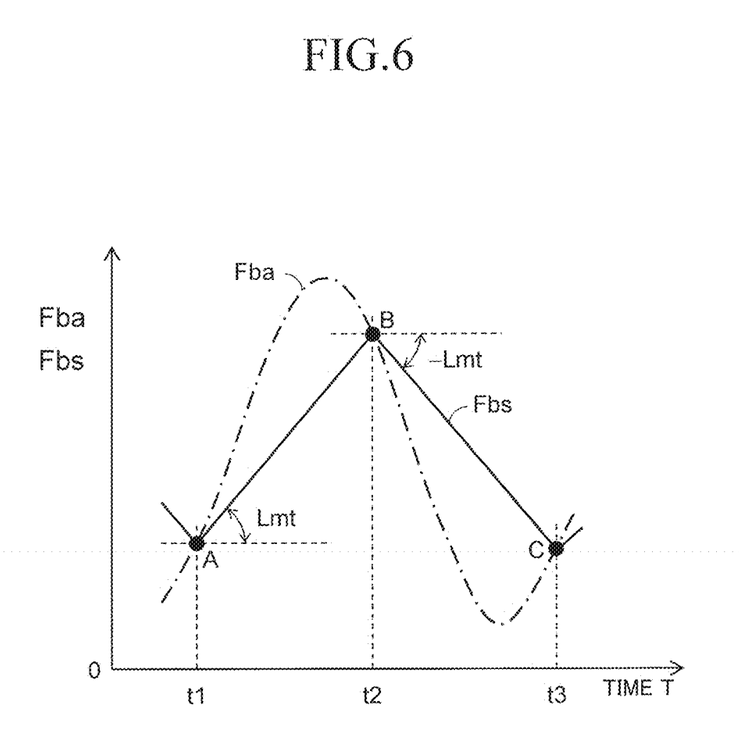
FIG. 6 is a graph showing a shift of a limit pressing force Fbs.

FIG. 6 shows an example of a shift of the limit pressing force Fbs. In this example, at a time point t1, the actual pressing force Fba (indicated by the alternate long and short dash line) increases from a point A. A temporal change amount during the increase exceeds the Lmt. Therefore, the limit pressing force Fbs is calculated as indicated by the solid line (straight line connecting the point A and a point B) in FIG. 6 using the limit value Lmt as an upper limit value of the temporal change amount. At a time point t2, the Fba and the Fbs become equal to each other. With elapse of time, the Fba is further reduced. However, the temporal change amount during the decrease of the actual pressing force Fba becomes smaller than −Lmt. Therefore, the limit pressing force Fbs is calculated as indicated by the solid line (straight line connecting the point B and a point C) in FIG. 6 using the −Lmt as a lower limit value of the temporal change amount.

As described above, in the limit pressing-force calculation block FBS (see FIG. 4), so-called rate limiter calculation processing is performed. Specifically, a change rate of the signal (Fba) is limited to the Lmt (upper limit change rate) and the −Lmt (lower limit change rate). Specifically, a first-order derivative (differential coefficient) of the actual pressing force Fba is limited based on the Lmt to calculate the limit pressing force Fbs.

In general, the noise removal in the signal processing is performed by filter processing with a low-pass filter or the like. However, the pressing-force fluctuation (thickness change component in the fluctuation) due to the change of the KTB in a thickness direction is correlated with the rotation speed of the wheel. Therefore, a frequency of the fluctuation (noise) becomes low at a low speed which is equal to or lower than a certain speed. As a result, it becomes difficult to reduce the noise by the above-mentioned filter. On the other hand, the Fbs is calculated with the limitation on the temporal change amount. Therefore, the noise (thickness change component) can be removed reliably even in a low-speed region without being affected by the rotation speed of the wheel.

Here, in place of the target speed dMkt of the electric motor, the first limit value Lthk can be calculated based on a target pressing-force change amount (corresponding to the operation speed correlation value) dFbt which is calculated from the target pressing force Fbt. As in the case of the Mkt, in the response characteristic calculation block RES, a response characteristic calculation is performed. In the target pressing-force change amount calculation block DFBT, the target pressing force Fbt is subjected to first-order differentiation to calculate the target pressing-force change amount dFbt. Then, in the first limit value calculation block LTHK, the first limit value Lthk can be calculated based on the dFbt, the Vwa, and the CHthk.

In the embodiment described above, the target value dMkt or dFbt is calculated based on the braking operation amount Bpa, and the limit value Lthk is calculated based on the dMkt or the dFbt. On the other hand, in place of the dMkt or the dFbt, the first limit value Lthk can be calculated based on the braking operation speed (corresponding to the operation speed correlation value) dBp which is calculated from the Bpa. In this case, in the braking operation speed calculation block DBP (see FIG. 4), the Bpa is subjected to the first-order differentiation to calculate the dBp. Then, in the first limit value calculation block LTHK, the first limit value Lthk can be calculated based on the dBp, the Vwa, and the CHthk.

Moreover, in place of the target value dMkt or dFbt, an actual value (actual speed of the electric motor) (corresponding to the operation speed correlation value) dMka can be used. In this case, in the actual speed calculation block DMKA (see FIG. 4), the actual speed (rotation speed) dMka of the electric motor can be calculated based on the actual position Mka of the electric motor. Specifically, the Mka is subjected to the first-order differentiation to calculate the dMka. Then, in the first limit value calculation block LTHK, the first limit value Lthk can be calculated based on the dMka, the Vwa, and the CHthk.

Even when the target pressing-force change amount dFbt, the braking operation speed dBp, or the actual rotation speed dMka of the electric motor is used, the same effects as those obtained when the target speed dMkt of the electric motor is used are obtained.

<Functions and Effects>

Figure 7:
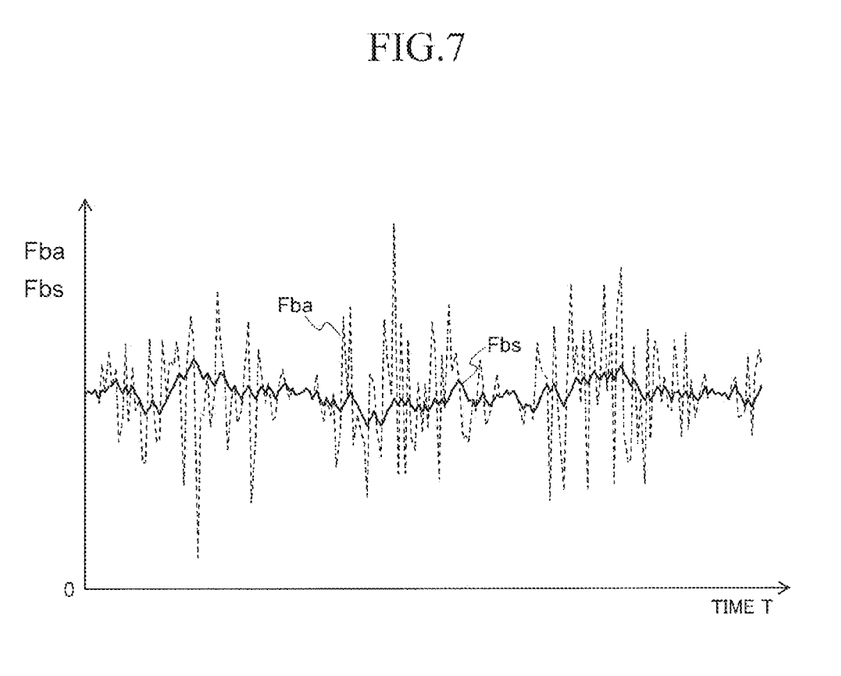
FIG. 7 is a graph showing functions and effects of the brake control device according to the embodiment of the present invention.

Now, referring to FIG. 7, functions and effects of the brake control device according to the present invention are described. In the brake actuator BRK, the feedback control is performed based on the deviation ΔFb between the target pressing force Fbt (target value) calculated from the braking operation amount Bpa and the actual pressing force Fba (actual value) acquired (detected) by the pressing-force acquisition means FBA. If the rotating member (for example, brake disc) KTB is deformed (for example, has unevenness in thickness), a fluctuation (noise) occurs in the actual pressing force Fba (indicated by the broken line in FIG. 7). By the fluctuation of the Fba, the energization amount of the electric motor becomes vibrational, thereby complicating the control of the electric motor. Moreover, depending on the response delay of the electric motor, the fluctuation of the braking torque is accelerated in some cases.

The actual pressing force Fba contains the component due to the braking operation by the driver (braking operation component) and the component due to the temperature expansion of the friction members MSB (temperature change component) in addition to the above-mentioned component due to the thickness of the rotating member (thickness change component). The temporal change amount of the pressing force, which is generated as a result of the braking operation by the driver, is proportional to the operation speed of the braking operation member (temporal change amount of the operation amount Bpa). Moreover, the temporal change amount of the pressing force due to the thermal expansion of the friction members is proportional to the temperature change of the friction members (temporal change amount of the Tmp). According to the brake control device of the present invention, the limit value Lmt is calculated based on the operation speed correlation value dBp, dMkt, dMka, or dFbt correlated with the temporal change amount of the braking operation amount Bpa by the driver and the temperature Tmp of the friction members. After the temporal change amount of the actual pressing force Fba is limited to the limit value Lmt, the limit pressing force Fbs (indicated by the solid line in FIG. 7) is calculated. Specifically, the braking operation component and the temperature change component remain in the limit pressing force Fbs, whereas the thickness change component is removed therefrom. In this case, the "operation speed correlation value" is a value correlated with the speed of the braking operation (operation speed). Any one of the operation speed (calculated by differentiating the Bpa) dBp of the BP, the target speed dMkt of the electric motor, and the target pressing-force change amount dFbt is used as the operation speed correlation value. Moreover, the actual speed dMka of the electric motor is obtained as the result of the dMkt. Therefore, the dMka can be used as the operation speed correlation value.

More specifically, according to the brake control device of the present invention, the limit value Lmt can be determined so as to increase in accordance with the increase of the operation speed correlation value (value correlated with the operation speed of the BP) dBp, dMkt, dMka, or dFbt. Therefore, when the operation speed of the braking operation member BP is high, the degree of suppressing the pressing-force fluctuation is lowered. Therefore, the responsiveness of the pressing force Fba with respect to the quick operation of the braking operation member BP can be ensured. On the other hand, when the operation speed of the braking operation member BP is low, the degree of suppressing the pressing-force fluctuation is elevated. Therefore, the above-mentioned thickness change component contained in the fluctuation of the pressing force Fba can be effectively removed.

As noise removal means, the low-pass filter (filter for attenuating a signal in a frequency band higher than a certain cutoff frequency) is conceivable. When the vehicle runs at a low speed (that is, when the wheel speed is low), however, a vibrational frequency of the thickness change component is low. Thus, it is difficult to remove the thickness change component. On the other hand, the limitation of the temporal change amount with the limit value Lmt is not affected by the wheel speed. Therefore, even when the vehicle speed is low, the vibration of the actual pressing force Fba can be reliably suppressed. By performing the above-mentioned feedback control based on the limit pressing force Fbs obtained by removing the fluctuation of the thickness change component, stable control over the electric motor can be achieved, while the vibration of the wheel braking torque can be suppressed.

When the vehicle speed (that is, the wheel speed Vwa) is low, the response of the electric motor can follow the braking-torque fluctuation due to the thickness change component in the feedback control over the pressing force. When the speed of the wheel (vehicle) is low, the limit value Lmt is calculated as a relatively large value to lower the degree of limiting the pressing-force fluctuation. As a result, the braking-torque fluctuation can be actively suppressed by the above-mentioned feedback control. When the vehicle speed (that is, the wheel speed Vwa) is high, it becomes difficult for the response of the electric motor to follow the braking-torque fluctuation due to the thickness change component (the response delay increases) in the feedback control over the pressing force. When the speed of the wheel (vehicle) is high, the limit value Lmt is calculated as a relatively small value to elevate the degree of limiting the pressing-force fluctuation. As a result, the braking-torque fluctuation can be reliably suppressed.

When the wheel speed Vwa is smaller than a predetermined value vw1, the limit value Lmt is set to "infinity ($\infty$)". As a result, the actual pressing force Fba can be calculated directly as the limit pressing force Fbs. Specifically, when Vwa<vw1 holds, the limitation with the limit value Lmt is not performed. As in the case described above, the braking-torque fluctuation of the wheel can be actively suppressed by the feedback control over the pressing force.

The invention claimed is:

1. A vehicle brake control device, comprising:
    operation amount acquisition means for acquiring an operation amount of a braking operation member for a vehicle by a driver;
    braking means for pressing a friction member against a rotating member fixed to a wheel of the vehicle through intermediation of an electric motor to generate a braking torque for the wheel;
    a force sensor which detects an actual pressing force with which the friction member actually presses the rotating member; and
    control means for calculating a target energization amount based on the acquired operation amount and the detected actual pressing force and controlling the electric motor based on the target energization amount,
    wherein the control means is configured to:
        calculate a target pressing force based on the acquired operation amount;
        calculate a limit value for suppressing a fluctuation of the actual pressing force based on an operation speed correlation value correlated with a temporal change amount of the acquired operation amount;
        calculate a limit pressing force obtained by placing a limitation on a temporal change amount of the detected actual pressing force based on the limit value; and
        calculate the target energization amount based on a deviation between the target pressing force and the limit pressing force.

2. A vehicle brake control device according to claim 1, further comprising temperature acquisition means for acquiring a temperature of the braking means,
    wherein the control means is configured to calculate the limit value based on a temporal change amount of the temperature.

3. A vehicle brake control device according to claim 2, further comprising wheel speed acquisition means for acquiring a speed of the wheel,
    wherein the control means is configured to determine an absolute value of the limit value to be relatively small when a rotation speed of the wheel is high and determine the absolute value of the limit value to be relatively large when the rotation speed of the wheel is low.

4. A vehicle brake control device according to claim 2, further comprising wheel speed acquisition means for acquiring a speed of the wheel,
    wherein the control means is configured to determine the actual pressing force as the limit pressing force when a rotation speed of the wheel is smaller than a predetermined value.

5. A vehicle brake control device according to claim 2, further comprising position acquisition means for acquiring an actual position of the electric motor,
    wherein the control means is configured to:
        calculate an actual speed of the electric motor based on the actual position; and
        calculate the limit value based on the actual speed as the operation speed correlation value.

6. A vehicle brake control device according to claim 2, wherein the control means is configured to determine the limit value based on a change pattern of the pressing force, which is acquired in advance when step-input of the target energization amount to the electric motor is performed.

7. A vehicle brake control device according to claim 1, further comprising wheel speed acquisition means for acquiring a speed of the wheel,
    wherein the control means is configured to determine an absolute value of the limit value to be relatively small when a rotation speed of the wheel is high and determine the absolute value of the limit value to be relatively large when the rotation speed of the wheel is low.

8. A vehicle brake control device according to claim 7, further comprising wheel speed acquisition means for acquiring a speed of the wheel, wherein the control means is configured to determine the actual pressing force as the limit pressing force when a rotation speed of the wheel is smaller than a predetermined value.

9. A vehicle brake control device according to claim 7, further comprising position acquisition means for acquiring an actual position of the electric motor,
wherein the control means is configured to:
calculate an actual speed of the electric motor based on the actual position; and
calculate the limit value based on the actual speed as the operation speed correlation value.

10. A vehicle brake control device according to claim 7, wherein the control means is configured to determine the limit value based on a change pattern of the pressing force, which is acquired in advance when step-input of the target energization amount to the electric motor is performed.

11. A vehicle brake control device according to claim 1, further comprising wheel speed acquisition means for acquiring a speed of the wheel,
wherein the control means is configured to determine the actual pressing force as the limit pressing force when a rotation speed of the wheel is smaller than a predetermined value.

12. A vehicle brake control device according to claim 11, further comprising position acquisition means for acquiring an actual position of the electric motor,
wherein the control means is configured to:
calculate an actual speed of the electric motor based on the actual position; and
calculate the limit value based on the actual speed as the operation speed correlation value.

13. A vehicle brake control device according to claim 11, wherein the control means is configured to determine the limit value based on a change pattern of the pressing force, which is acquired in advance when step-input of the target energization amount to the electric motor is performed.

14. A vehicle brake control device according to claim 1, further comprising position acquisition means for acquiring an actual position of the electric motor,
wherein the control means is configured to:
calculate an actual speed of the electric motor based on the actual position; and
calculate the limit value based on the actual speed as the operation speed correlation value.

15. A vehicle brake control device according to claim 14, wherein the control means is configured to determine the limit value based on a change pattern of the pressing force, which is acquired in advance when step-input of the target energization amount to the electric motor is performed.

16. A vehicle brake control device according to claim 1, wherein the control means is configured to determine the limit value based on a change pattern of the pressing force, which is acquired in advance when step-input of the target energization amount to the electric motor is performed.

* * * * *